(12) United States Patent
Bianco et al.

(10) Patent No.: US 12,319,505 B2
(45) Date of Patent: Jun. 3, 2025

(54) SELECTIVE ACCESS DEVICE FOR A PICKING/DEPOSIT STATION IN A WAREHOUSE, AND PICKING/DEPOSIT STATION PROVIDED WITH SUCH SELECTIVE ACCESS DEVICE

(71) Applicant: ICAM S.R.L., BA (IT)

(72) Inventors: Roberto Bianco, BA (IT); Leonardo Antonio Veccaro, BA (IT); Graziano Bianco, BA (IT)

(73) Assignee: ICAM S.R.L., BA (IT)

( * ) Notice: Subject to any disclaimer, the term of this patent is extended or adjusted under 35 U.S.C. 154(b) by 304 days.

(21) Appl. No.: 17/794,194

(22) PCT Filed: Jan. 20, 2021

(86) PCT No.: PCT/IB2021/050416
§ 371 (c)(1),
(2) Date: Jul. 20, 2022

(87) PCT Pub. No.: WO2021/148957
PCT Pub. Date: Jul. 29, 2021

(65) Prior Publication Data
US 2023/0034342 A1 Feb. 2, 2023

(30) Foreign Application Priority Data
Jan. 20, 2020 (IT) .................. 102020000000985

(51) Int. Cl.
*B65G 1/137* (2006.01)
*A47G 29/22* (2006.01)

(52) U.S. Cl.
CPC ........... *B65G 1/1373* (2013.01); *A47G 29/22* (2013.01); *B65G 1/137* (2013.01); *B65G 2201/0258* (2013.01)

(58) Field of Classification Search
CPC ...... B65G 1/1373; B65G 1/127; B65G 1/137; B65G 2201/0258; G06Q 10/0836; A47G 29/141; A47G 29/20; A47G 29/22
See application file for complete search history.

(56) References Cited

U.S. PATENT DOCUMENTS

| 5,638,985 A | 6/1997 | Fitzgerald et al. |
| 5,820,237 A | 10/1998 | Robey |

(Continued)

FOREIGN PATENT DOCUMENTS

| CN | 101784465 A | 7/2010 |
| CN | 204324143 U | 5/2015 |

(Continued)

OTHER PUBLICATIONS

Product brochure "EffiMat Storage Technology", Feb. 2016, https://web.archive.org/web/20220530151420/https:ff.nordiskemedier.dk/20pk4fl1odjmdcoa.pdf.

(Continued)

*Primary Examiner* — William L Miller
(74) *Attorney, Agent, or Firm* — Ruggiero McAllister & McMahon LLC

(57) ABSTRACT

A selective access device for a picking/deposit station in an automated warehouse defines an area which is accessible after having formed a passage having a front edge, a rear edge and two side edges opposite one another; the device is provided with a first cover engaging the area and includes a roller shutter, which is operated to open, so as to define the front edge of the passage, and with a second cover, which engages the area above the first cover, is defined by a plurality of doors beside one other along a first straight axis and is operated to open so as to define the side edges of the passage; the doors can slide to open and close along respective second axes orthogonal to the first axis, so as to also (Continued)

define the rear edge of the passage when the second cover is open.

10 Claims, 6 Drawing Sheets

(56) References Cited

U.S. PATENT DOCUMENTS

| | | | |
|---|---|---|---|
| 6,450,598 B1 | 9/2002 | Hanel | |
| 8,145,351 B2* | 3/2012 | Schininger | G07F 9/009 |
| | | | 221/12 |
| 9,120,624 B1* | 9/2015 | Cassady | G06Q 10/0836 |
| 9,211,025 B1* | 12/2015 | Elhawwashy | A47G 29/20 |
| 9,504,344 B2* | 11/2016 | Sarvestani | A47G 29/1201 |
| 10,624,484 B1* | 4/2020 | Mountford | B60P 3/03 |
| 11,191,382 B2* | 12/2021 | Likins | A47G 29/1201 |
| 11,341,346 B2* | 5/2022 | Lõssov | G07F 11/165 |
| 11,759,826 B1* | 9/2023 | Baring | B65G 1/1373 |
| | | | 414/807 |
| 2002/0130135 A1 | 9/2002 | Fitzgerald et al. | |
| 2002/0177922 A1 | 11/2002 | Bloom | |
| 2004/0031574 A1 | 2/2004 | Gambarelli et al. | |
| 2010/0006636 A1* | 1/2010 | Frankenberg | A47G 29/22 |
| | | | 232/44 |
| 2016/0066732 A1 | 3/2016 | Sarvestani | |
| 2016/0235236 A1* | 8/2016 | Byers | A47G 29/14 |
| 2021/0007523 A1* | 1/2021 | Baek | A47G 29/141 |
| 2021/0196069 A1* | 7/2021 | Likins | G07F 11/56 |
| 2021/0261336 A1* | 8/2021 | Ingram-Tedd | B65G 1/1373 |
| 2021/0321810 A1* | 10/2021 | Sun | G07F 11/1653 |
| 2022/0033187 A1* | 2/2022 | Bianco | B65G 1/1375 |
| 2022/0297938 A1* | 9/2022 | Austrheim | B65G 1/0414 |
| 2023/0028034 A1* | 1/2023 | Gravelle | B65G 1/0485 |
| 2023/0044060 A1* | 2/2023 | Carr | B64C 39/024 |
| 2023/0165395 A1* | 6/2023 | Leradi | A47G 29/141 |
| | | | 232/44 |
| 2023/0257197 A1* | 8/2023 | Reminder | B65G 1/04 |
| | | | 211/60.1 |
| 2023/0316218 A1* | 10/2023 | Davies | A47G 29/141 |
| | | | 705/339 |
| 2024/0002115 A1* | 1/2024 | Chernykh | B65D 55/02 |
| 2024/0017925 A1* | 1/2024 | Bianco | G07F 9/105 |
| 2024/0158173 A1* | 5/2024 | Sato | G06Q 10/08 |

FOREIGN PATENT DOCUMENTS

| | | |
|---|---|---|
| EP | 0 370 375 E2 | 11/1989 |
| EP | 1 061 013 A1 | 12/2000 |
| EP | 1 404 595 B1 | 4/2004 |
| EP | 2 203 365 B1 | 10/2011 |
| EP | 3 044 129 A1 | 7/2016 |
| EP | 3 088 335 A1 | 11/2016 |
| EP | 3 120 826 A1 | 1/2017 |
| IT | 2014A000385 | 5/2014 |
| WO | 2003/006345 A1 | 1/2003 |
| WO | 201700089864 A1 | 1/2003 |
| WO | 2015/036879 A1 | 3/2015 |
| WO | 2019/026042 A1 | 2/2019 |

OTHER PUBLICATIONS

YouTube Video "Excellent ergonomics of Lagerautomat EffiMat, EffiMat Storage Technology", Oct. 22, 2014, https://www.youtube.com/watch?v=Fkbdy2uUG-I.

International Search Report and Written Opinion dated Apr. 12, 2021 from corresponding International Patent Application No. PCT/IB2021/050416, 12 pages.

Chinese First Office Action dated Feb. 22, 2025 from corresponding Chinese Patent Application No. 202180010337.9, 18 pages.

* cited by examiner

SELECTIVE ACCESS DEVICE FOR A PICKING/DEPOSIT STATION IN A WAREHOUSE, AND PICKING/DEPOSIT STATION PROVIDED WITH SUCH SELECTIVE ACCESS DEVICE

CROSS-REFERENCE TO RELATED APPLICATIONS

This Patent Application is a national stage application under 35 U.S.C. § 371, of PCT/IB2021/050416 filed on Jan. 20, 2021, and claims priority from Italian Patent Application No. 102020000000985 filed on Jan. 20, 2020, the entire content all of which is incorporated by reference herein in their entirety.

BACKGROUND OF THE DISCLOSURE

1. Field of the Disclosure

The invention relates to a selective access device for a picking/deposit station in an automated warehouse.

2. Description of the Related Art

Automated warehouses are normally provided with storing areas having a plurality of emplacements housing respective containers or trays, which normally have a rectangular shape in plan view and are generally provided with compartments aimed at containing the stored objects. These warehouses also have a picking/deposit station or bay, to which users have access to store and/or retrieve objects. The trays, by means of automatic motor-driven mechanisms, are transferred from their positions in a housing of the picking/deposit bay and are placed so that a side wall of the trays, corresponding to one of the sides of their rectangular shape, is arranged in front of the user.

In some warehouses, the picking/deposit bay is also provided with a selective access device, which is arranged above the aforesaid housing so as prevent it from being accessed, for safety reasons, and is configured so as to open only at the underneath compartments to be accessed by the users.

In some known solutions, such as for example EP1404595B1 and EP2203365B1, the selective access device is a door device. In other solutions, such as patent application ITTO2014A000385 in the name of the Applicant, or such as document EP3120826A1, the selective access device includes roller shutters or rolling gates in order to increase the flexibility in opening larger or smaller areas above the tray.

In patent application IT 102017000089864 and WO 2019/026042, in the name of the Applicant, and corresponding to the preamble of claim 1, the selective access device uses two overlapping covers, one formed by two roller shutters or rolling gates and the other one formed by a series of rotary doors, so as to increase the degree of safety, namely in order to reduce the risk of forced opening.

A need is felt for improving the latter solution, in particular so as to increase the general reliability and/or reduce the components and, hence, the costs of the device, and/or simplify the movements of the doors and/or reduce the space needed by the doors during their movements and/or increase user safety.

SUMMARY

Aim of the invention is to provide a selective access device for a picking/deposit station in a warehouse, which fulfils the above-mentioned needs in a simple and economic manner.

According to the invention, there is provided a selective access device for a picking/deposit station in a warehouse as defined in claim 1.

According to the invention, furthermore, there is provided a picking/deposit station in a warehouse as defined in claim 10.

BRIEF DESCRIPTION OF THE DRAWINGS

The invention will now be described with reference to the accompanying drawings, which show a non-limiting embodiment thereof, wherein.

DETAILED DESCRIPTION

Figure 1:
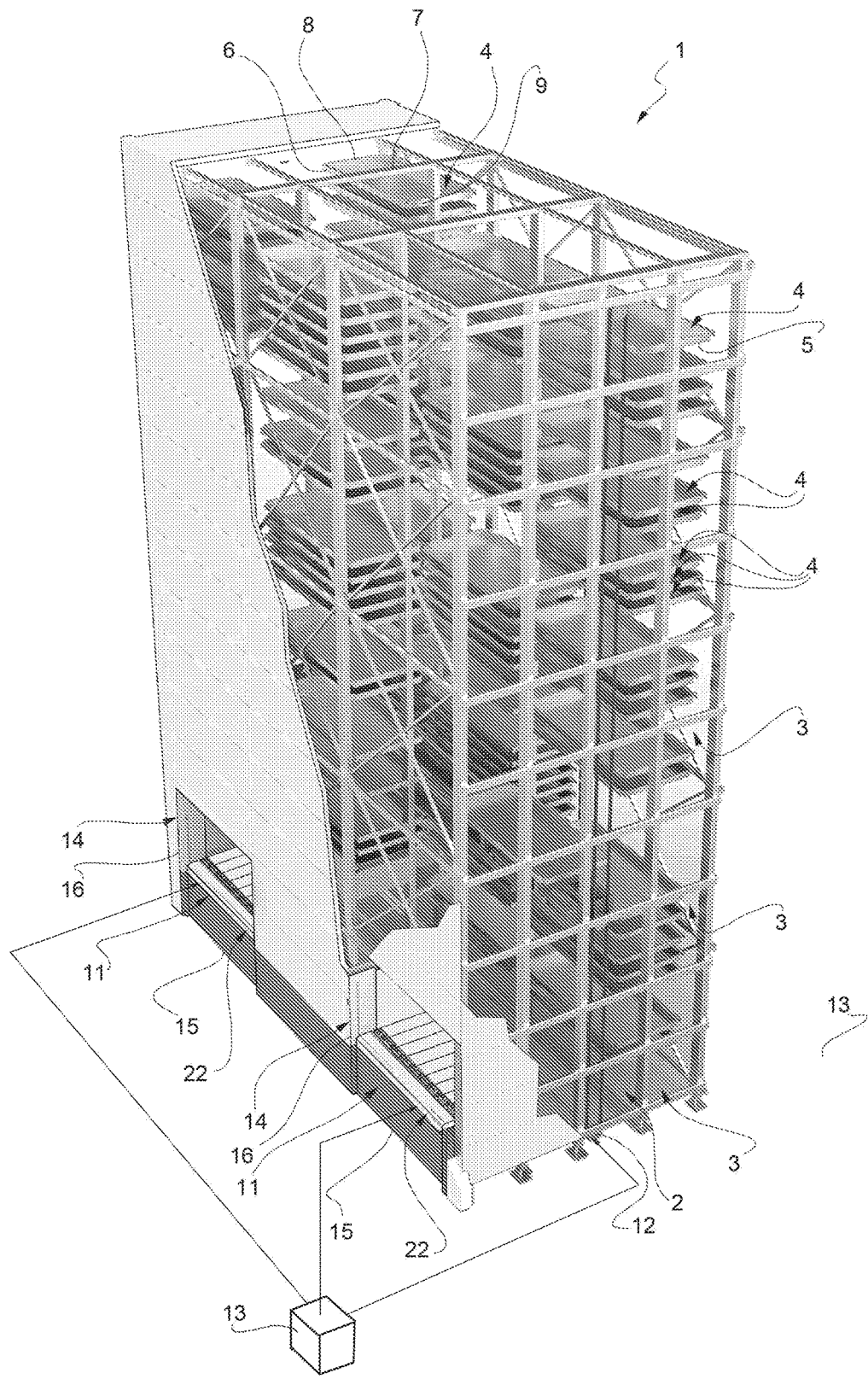
FIG. 1 is a perspective view, with parts removed for greater clarity, of an automated vertical warehouse with picking/deposit stations provided with a preferred embodiment of the selective access device according to the invention.

In FIG. 1, reference number 1 indicates an automated warehouse comprising a fixed structure 2 and having a plurality of predefined emplacements 3 where to store respective loading units 4, which are defined, in particular, by containers or trays. Each loading unit 4 has a base 5 with a rectangular perimeter, which is defined by a pair of long sides 6 and 7, parallel to one another, and by a pair of short sides 8 and 9, orthogonal to the long sides 6,7. According to a variant which is not shown herein, the loading unit 4 has a substantially square base.

Each loading unit 4 has a side wall, projecting upwards from the perimeter of the base 5, and a plurality of inner walls, which divide the total volume of the loading unit 4 into sectors or compartments (not shown), where different articles (not shown) can be housed.

The warehouse 1 further comprises one or more picking/deposit stations 11, which define respective access points to the warehouse 1, as they allow one or more users (no shown) to retrieve articles from the compartments of the loading units 4 and to deposit and store articles into such compartments.

The warehouse 1 further comprises: a motor-driven transfer device, for example a lifter 12, which is configured so as to transfer the loading units 4 between their emplacements and the stations 11; and a processing and controlling unit 13 (schematically shown), which is configured with suitable software concerning the management and the storing of the articles (for example, configured so as to control the lifter 12 and, hence, the transfer of the loading units 4 based on user commands and/or settings; choose the loading unit 4 to be sent to the stations 11 based on optimization strategies;

provide users with instructions or other information at the stations 11; monitor the state of the stock; etc.).

In the particular embodiment shown herein, the stations 11 are recessed in the structure 2 of the warehouse 1. According to an alternative which is not shown herein, the stations 11 are defined by islands projecting from the structure 2.

The station 11 comprises a front wall 15 (FIG. 1) and two vertical sides 16 (FIG. 2), which are spaced apart from one another along a horizontal axis A. Hereinafter, terms such as "sides", "laterally", "front", "at the front", "rear", "at the back", etc. are meant with reference to the point of view of a user standing in front of the station 11 during retrieving/storing of the articles.

Figure 4:
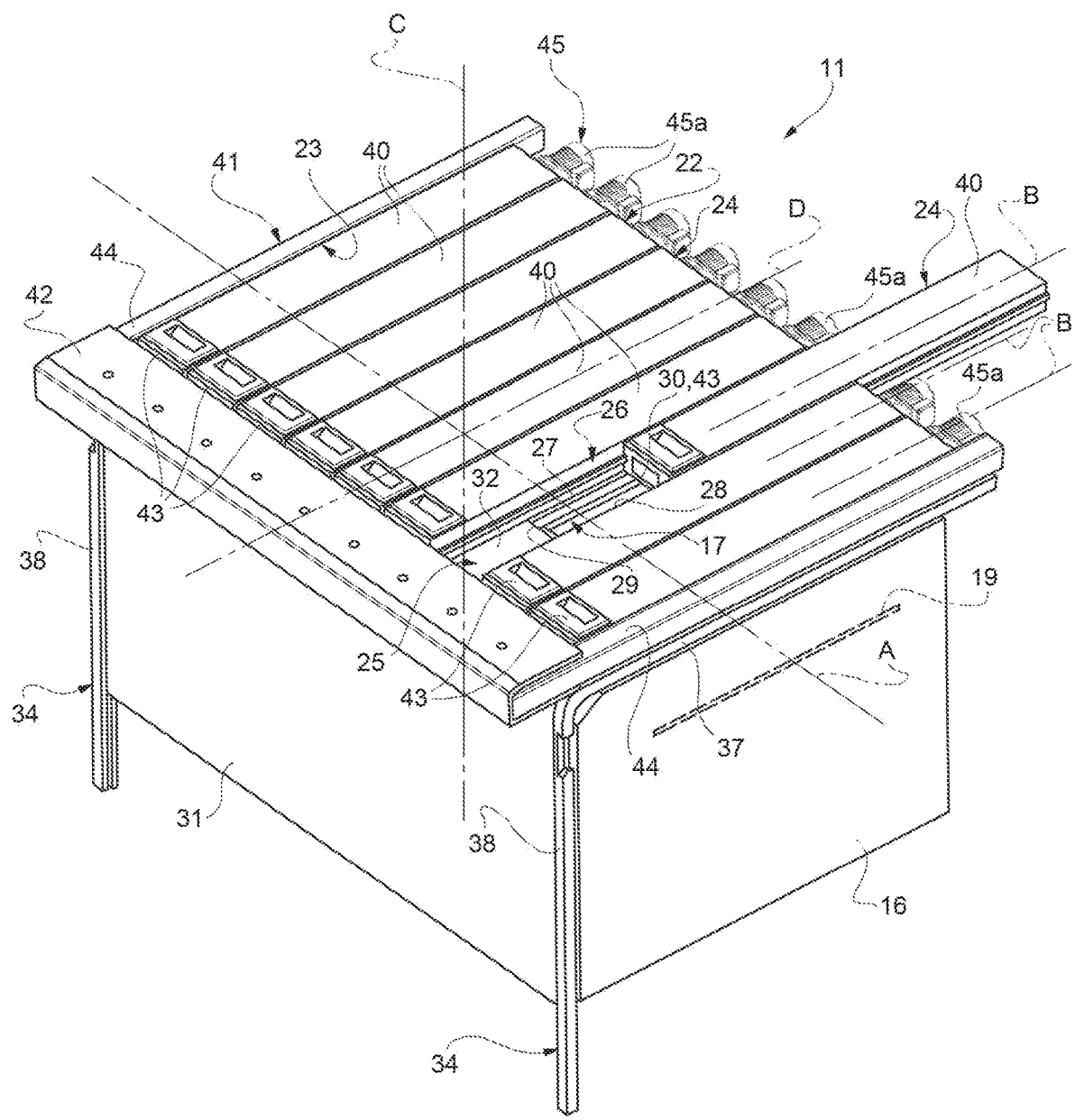
FIG. 4 is similar to FIG. 2 and shows the picking/deposit station in an opening operating condition.

With reference to FIG. 4, the station 11 has a housing 17 with dimensions such as to accommodate at least one loading unit 4 between the sides 16, behind the wall 15. The station 11 comprises a support device (not shown) coupled to the sides 16, so as to bear the loading unit 4 in the housing 17. For example, the support device is a known support device and comprises a pair of guides or channels 19, which are parallel to one another and orthogonal to the axis A, are respectively carried by the sides 16 and are configured so as to receive the loading unit 4 when the latter is transferred from the lifter 12 into the housing 17.

According to an embodiment, such support device is fixed relative to the sides 16. According to an alternative which is not shown herein, the support device is movable due to the action of an actuator device controlled by the unit 13, so as to rotate about an oscillation axis parallel to the axis A, if necessary in combination with a translation motion towards the user, between a first operating condition, in which the base 5 of the loading unit 4 supported in the housing 17 is in a horizontal position in order to be transferred from and to the lifter 12, and a second operating condition, in which the base 5 is inclined at an angle other than 0° and 90°. In this case, one or more stop devices are provided in order to prevent the loading unit 4 from sliding downwards, due to its own weight, when it is inclined. The unit 13 is configured to rotate (or rotate-translate) the support device in an automatic manner immediately after the loading unit 4 has entered the housing 17 and immediately before its exiting transfer.

Figure 2:
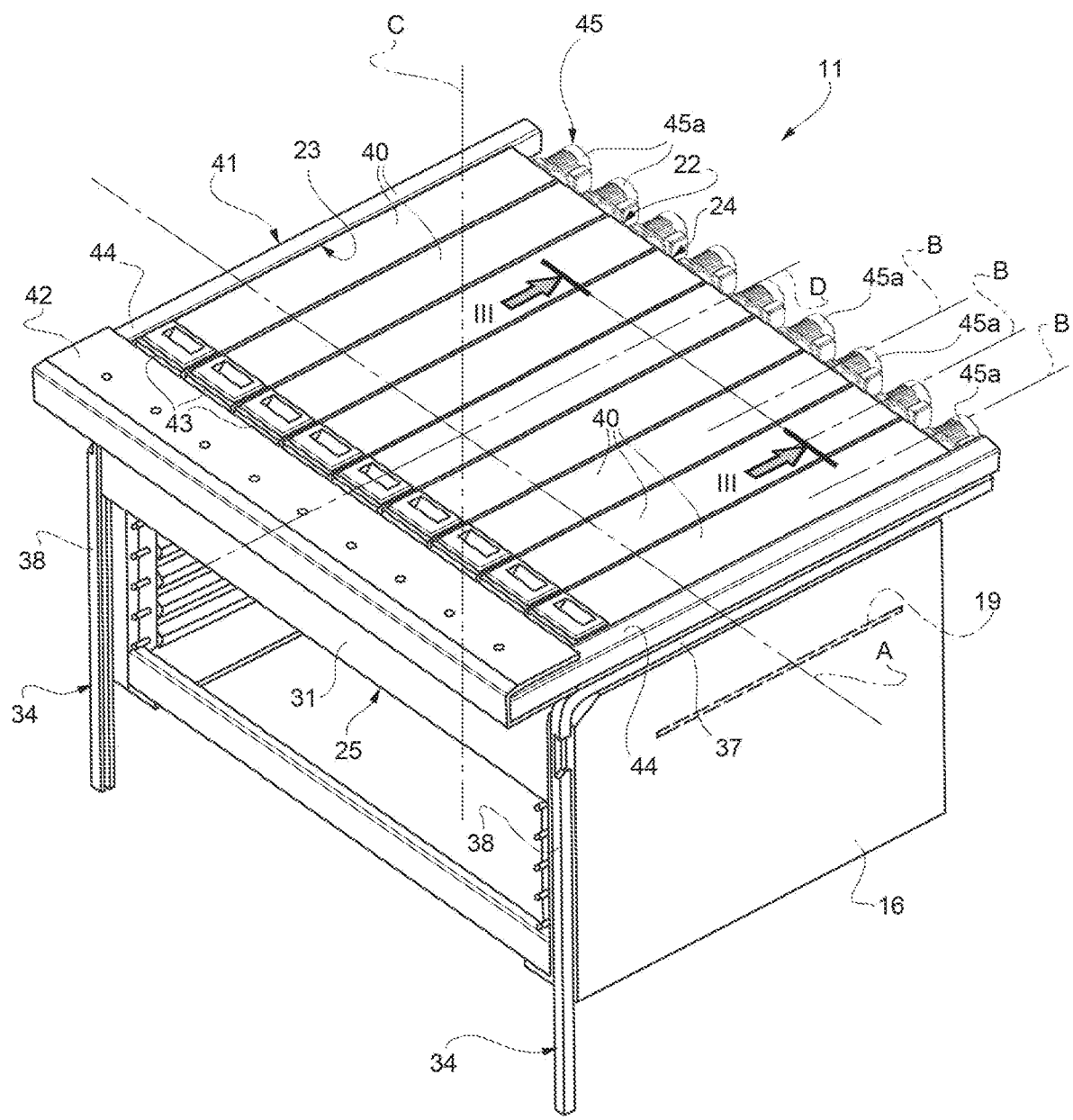
FIG. 2 is a perspective, on a larger scale, partially showing, with schematic parts, one of the picking/deposit stations of FIG. 1.

With reference to FIG. 2, the station 11 further comprises a selective access device 22, which is coupled to the sides 16 in a fixed position and defines an access area 23, which has a rectangular shape and is arranged above the housing 17. In particular, the rectangular perimeter of the area 23 has two long sides parallel to the axis A and two short sides parallel to an axis D, which is orthogonal to the axis A.

The area 23 is aligned with the housing 17 along an axis C: in the embodiment shown herein, the device 22 and the area 23 are arranged horizontally, so that the axis C is vertical and fixed; according to a variant which is not shown herein, the device 22 and the area 23 are arranged with a predetermined fixed inclination relative to the horizontal direction, so that the axis C is fixed and is inclined relative to the vertical direction; finally, according to a further variant which is not shown herein, the entire device 22, with the device supporting the loading unit 4, can be rotated (or rotated-translated) about an axis that is parallel to the axis A, by means of an actuator controlled by the unit 13, between a horizontal position and an inclined position, so that, in this specific case, the axis C is movable as well.

According to FIG. 4, the device 22 comprises two covers 24 and 25, which engage the area 23 and are arranged along respective parallel planes, which overlap one another and are orthogonal to the axis C, so as to forbid unauthorized accesses from the top towards the housing 17.

The covers 24 and 25 can be opened in an independent, though coordinated manner so as to form, through the area 23, a passage 26 that allows users to access from the top only those articles and/or compartments for which they are authorized. The perimeter 26 of the passage consists of two edges 27 and 28 parallel to the axis D and of two edges 29 and 30 parallel to the axis A, wherein the edge 29 is the one closer to users, namely to the wall 5, whereas the edge 30 is the opposite one, namely the farther one.

According to a preferred aspect of the invention, the width of the passage 26 is variable in a discrete manner along the axis A and in a continuous manner along the axis D.

According to a further preferred aspect of the invention, after having opened the device 22 (FIG. 4), the cover 24 defines the edges 27, 28 and 30 of the passage 26, whereas the cover 25 defines the edge 29.

The cover 25 is preferably defined by one single roller shutter or rolling gate 31, which is operated by a motor-driven device (not shown) defined, for example, by a winding device or by a rope or belt device controlled by the unit 13.

The roller shutter 31, along the axis A, has a width equal the one of the area 23 and consists, for example, of rigid strips parallel to the axis A and coupled to one another in an articulated manner, or of a flexible sheet, or of a cloth, or of a mesh-like structure, etc., so that it can follow one or more bends with a bending axis parallel to the axis A.

The side edges of the roller shutter 31 engage, in a sliding manner, respective guides 34, which are arranged at the sides 16 and comprise an upper straight segment 37 parallel to the axis D, at the area 23, and a lower segment 38, which is joined to the segment 37.

The roller shutter 31 ends with a portion 32, which slides along the axis D in the segment 37 of the guides 34. It is evident that the roller shutter 31 can slide along the guides 34 between a closed condition, in which the roller shutter 31 completely obstructs the area 23, and an open condition, defining a variable opening along the axis D, in which the roller shutter 31 at least partially frees the area 23 so as to define the edge 29 of the passage 26 by means of an end edge of the portion 32.

According to an aspect of the invention, the cover 24 consists of a series or doors 40, which are coplanar to one another, in the plane defined by the axes A and D, and can slide along respective axes B, which are parallel to the axis D.

The doors 40 are supported by a frame 41, which is arranged above the guides 34 and is fixed relative to the sides 16 and/or to the guides 34. The frame 41 comprises a front crossbeam 42 and two side arms 44 joined to the crossbeam 42. The latter is parallel to the axis A and is arranged at the front wall 15, close to users during use, so that it occupies one of the long sides of the perimeter of the area 23, whereas the arms 44 are parallel to the axis D and are arranged along the sides 16 and/or above the segments 37 of the guides 34, so that they occupy the short sides of the perimeter of the area 23.

The cover 24 can be configured between a closed condition (FIG. 2), in which the doors 40 are all beside one another along the axis A and have respective end edges 43 all resting against the crossbeam 42, so as to completely close the area 23 and cover the portion 32 of the roller shutter 31; and an open condition (FIG. 4), in which at least one of the doors 40 is translated backwards, with its end edge 43 spaced apart from the crossbeam 42; in this condition, the edge 30 of the passage 26 is defined by the end edge 43 of the door that has been translated, whereas the edges 27 and 28 of the passage 26 are defined by the sides of two adjacent doors between which the translated door is located (or they are defined by one of the arms 44 of the frame 41 and by the side of the sole adjacent door, if the translated door is arranged at one of the side ends of the area 23).

The doors 40 are preferably coupled to one another and to the arms 44 of the frame 41 by means of guides 44a (FIG. 3), which allow them to slide along the axes B and, at the same time, are configured so as to support the doors 40 along the axis C, in order to prevent the cover 24 from falling or bending downwards, namely towards the cover 25 and/or the housing 17; the support exerted by the guides 44a and/or the height of the doors 40 preferably are such as to avoid the use of possible frame elements in addition to the crossbeam 42 and the arms 44.

In the closed condition of FIG. 2, the axial length of each door 40 is at least equal to the depth of the area 23. At the same time, the space between the arms 44 of the frame 41 along the axis A is divided into many segments, each closed by a respective door 40 in a selective and independent manner.

The opening and the closing of the cover 24, namely the translation of the doors 40, are preferably carried out by means of a motor-driven moving device 45, which is controlled by the unit 13.

Figure 3:
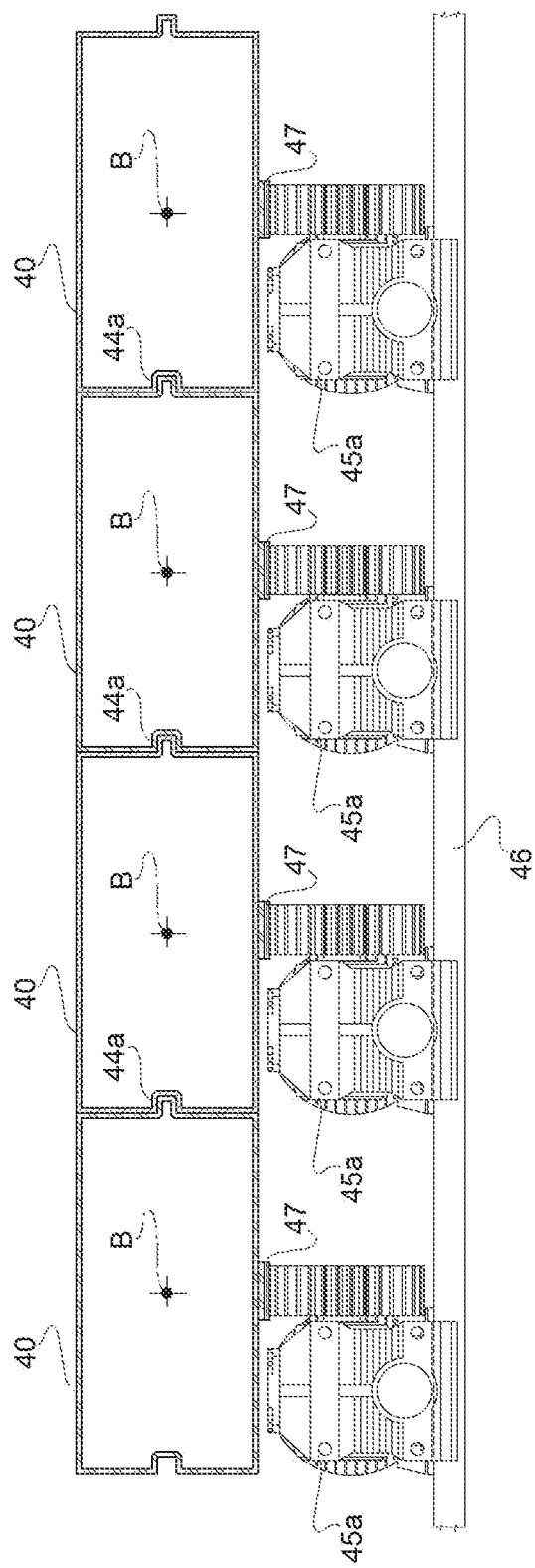
FIG. 3 is a schematic cross section along the section line III-Ill of FIG. 2.

In the schematic example of FIGS. 2 and 3, the device 45 comprises a respective linear or rotary actuator 45a for each one of the doors 40. According to this example, the actuators 45a are supported by a reference member 46 (schematically shown), which is arranged in a fixed position at the opposite end relative to the crossbeam 42, for example under the doors 40. Hence, the actuators 45a drag the corresponding doors 40 back and forth relative to such member 46 along the respective axes B. For instance, the actuators 45a are defined by rotary motors, which operate the doors 40 by means of respective transmissions 47 of the rack and pinion type. The transmissions 47 can also be belt transmissions or other types of the transmissions.

Figure 5:
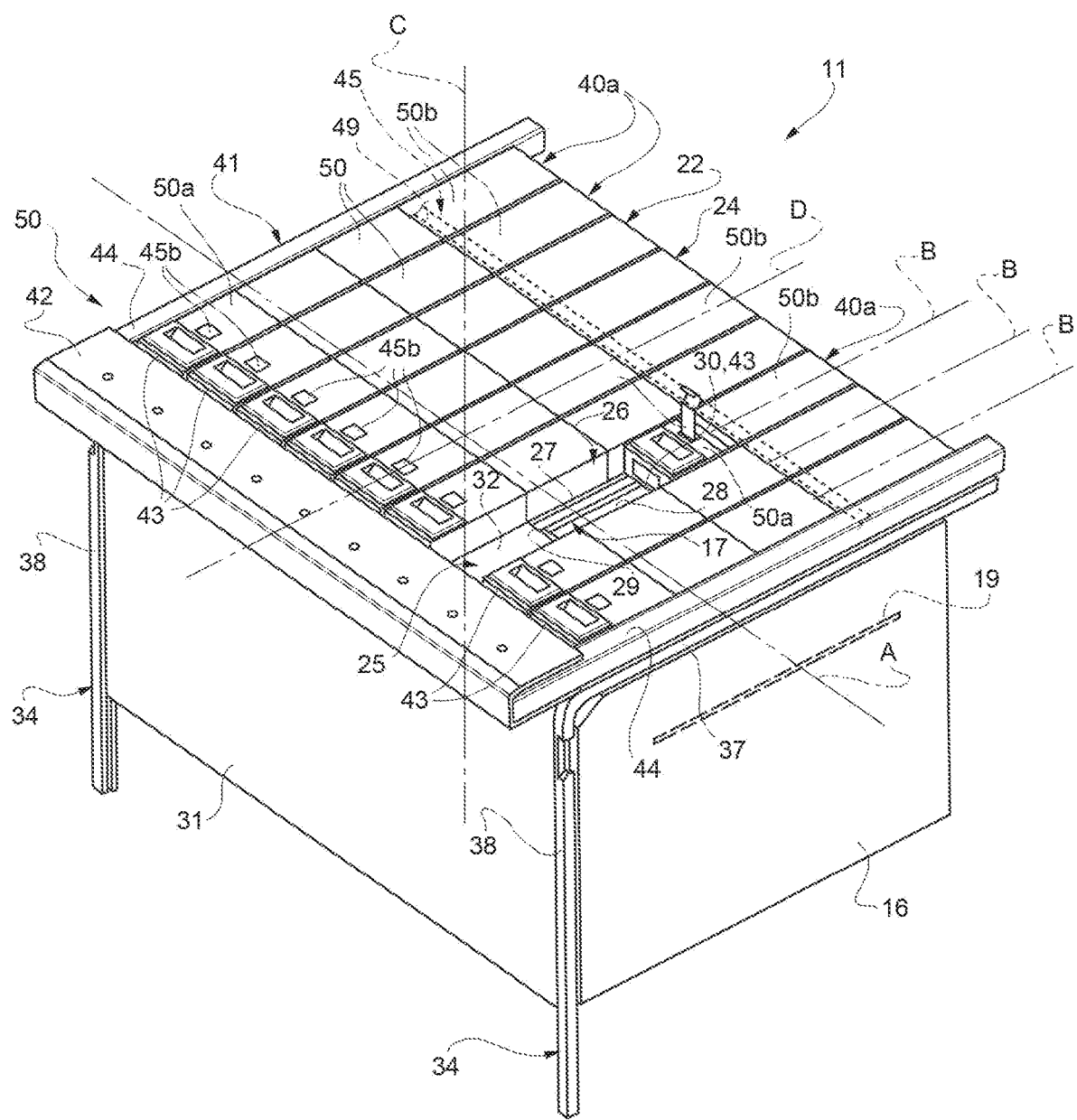
FIGS. 5 and 6 are similar to FIG. 4 and show respective variants of the selective access device according to the invention.

In the example of the device 45 schematically shown in FIG. 5, the doors 40 carry respective actuators 45b, which are preferably controlled by means of wireless technologies and comprise respective clutch elements, defined for example by respective vertical pins and operated so as to engage and disengage a dragging member 49, which is movable along the axis D due to the action of a motor, which is not shown, so as to cause the engaged door 40 to be translated.

In any case, the type and configuration of the device 45 are not very important. Indeed, the doors 40 could be moved in a manual manner. To this aim, the doors 40 comprise respective handle portions, which are shaped so as to be easily grabbed by a hand and are arranged close to the end edges 43.

According to an aspect of the invention, a stop system is provided, which is controlled by the unit 13 so as to stop the stroke of each door 40 along the axis B at the position that is needed to define the width of the passage 26 requested by the management system.

The stop system can preferably be defined by a motor or actuator, which exerts, upon the backward movement of the doors 40, a resisting torque, which is controlled based on the translation stroke. More preferably, in the first example described above, for FIG. 2, the stop system is defined by the actuators 45a themselves; in the second example described above, for FIG. 5, the stop system is defined by the motor acting upon the translation of the dragging member 49.

For each door 40, the device 22 can also comprise a respective electric lock (not shown), which is carried by the crossbeam 42 and keeps the door 40 in the closed position. The electric locks are controlled by the unit 13 independently of one another. For example, the locks are opened by the unit 13 when users are authorized to move the corresponding doors 40 and access a compartment below. The locks can also be absent and the locking function can be carried out by the aforesaid stop system.

If needed, depending on the width of the compartments to be accessed, the unit 13 can unlock and open two or more contiguous doors 40.

According to the variant of FIG. 5, the cover 24 comprises telescopic doors 40a, namely each consisting of a respective row of elements 50 that are coupled to one another so as to be able to slide along the axis B relative to one another in order to assume a compact configuration, so that the space taken up by the device 22 behind the housing 17 is limited when the door 24 is open. Each door 40a preferably comprises a respective front end element 50a, which defines the end edge 43, and a respective rear end element 50b, which is opposite the element 50a. The elements 50b preferably are fixed and all support the other sliding elements in front of them. In this case, the above-mentioned guides 44a for the sliding coupling between the doors 40 could be absent, as the support and guide function could be carried out by the sliding coupling between the elements 50.

The device 45 and/or the stop system act upon the elements 50a. In the example shown in FIG. 5, as mentioned above, the actuators 45b are carried by the elements 50a and the dragging member 49 can translate and is arranged above or under the elements 50a, in the closed condition of the cover 24, so that it can be engaged by the clutch elements of such actuators 45b.

According to a variant which is not shown herein, the device 45 ad/or the stop system are arranged inside the telescopic doors 40a. For example, the device 45 and/or the stop system comprise actuators carried by the elements 50b and respective belt transmissions or tie rod transmissions to drag the elements 50a back and forth, with their end edges 43.

Figure 6:
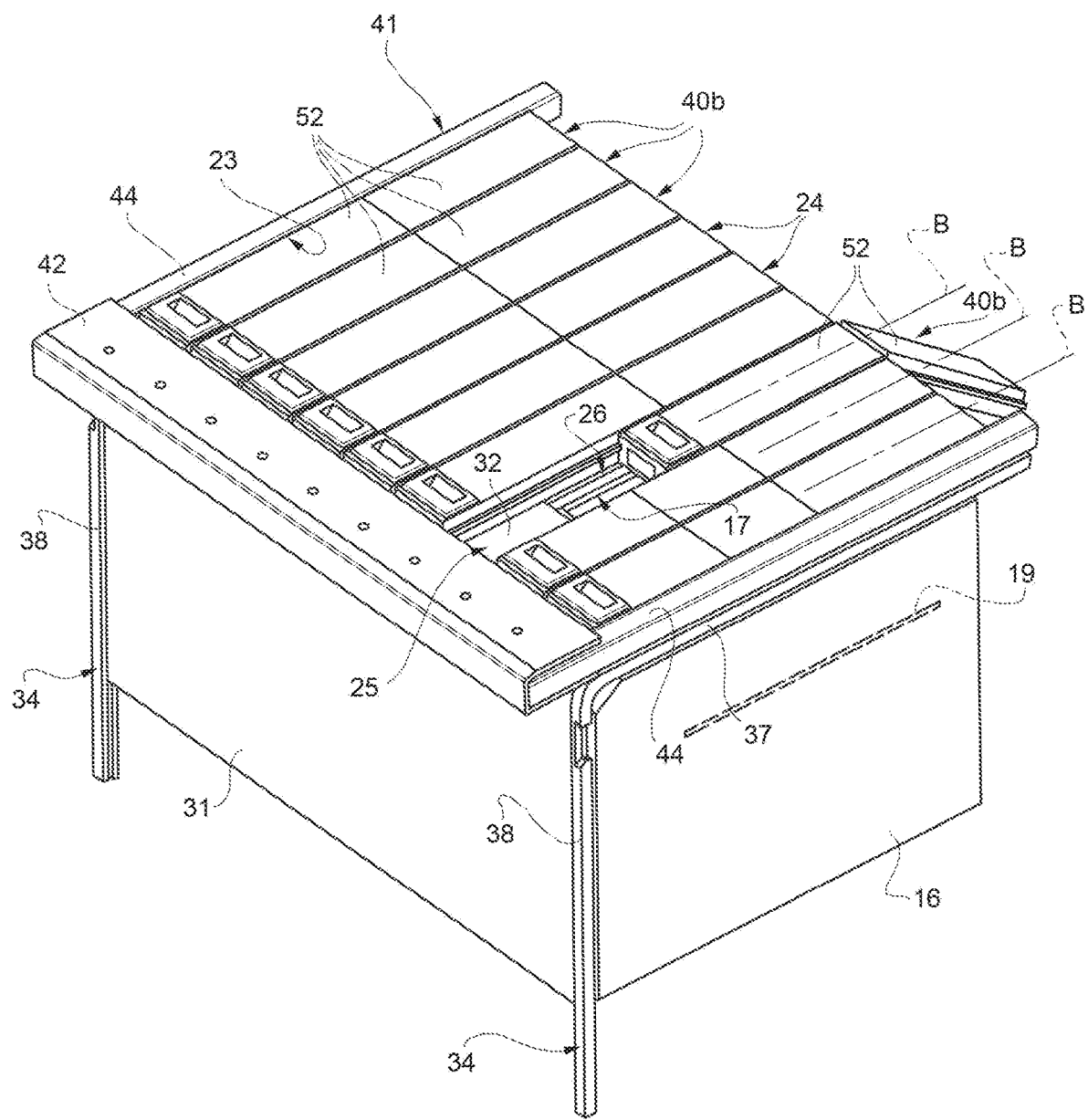

According to the variant of FIG. 6, the cover 24 comprises doors 40b, each consisting of a respective row of elements or portions 52, which are coupled to one another so as to be able to rotate relative to one another about horizontal axes parallel to the axis A. Each row consists of two or three, preferably two, elements 52.

In this way, the elements or portions 52 of each door 40b rotate or bend downwards once they are out of the area 23 during the opening operations, so as to limit the space taken up by the device 22 behind the housing 17. In particular, the elements 52 of each door 40b are guided (for example, by means of the guides 44a of FIG. 3) so as to remain aligned along the respective axes B, when they are at the area 23, and are free to rotate downwards, for example due to their own weight, behind the area 23 during the backward movement.

A proper re-alignment system (defined, for example, by a guiding wall) is provided in order to then cause the elements 52 of each door 40b to rotate upwards and be aligned again along the respective axes B, when the door 40b is re-closed. If the rack and pinion transmissions 47 of FIG. 3 are used to drag the elements 52 along the respective axes B, the pinion of each transmission 47 can also help in lifting and re-aligning the elements 52 during the closing of the corresponding door 40b.

As mentioned above, during operation of the device 22 according to the present invention, the unit 13, after having made sure that the user is authorized and having identified the loading unit 4 and the compartment to be accessed, controls the lifter 12 so as to displace the loading unit 4 into the housing 17. Then, if a motor-driven inclination (or rotation-translation) system is provided, the unit 13 controls it so as to incline the loading unit 4.

Immediately afterwards, the unit 13 controls the operation of the cover 25 so as to place the end edge of the roller shutter 31 in the position requested to define the edge 29 of the passage 26, in a position that is aligned with a corresponding front edge of the compartment to be accessed. In particular, this movement takes place while the cover 24 is closed.

Then, the unit 13 unlocks one or more doors 40/40a/40b corresponding to the width of the compartment to be accessed, so as to obtain the edges 27, 28 and 30 of the passage 26. As mentioned above, the movement can be manually operated with a final stop or can be motor-operated. The translation stops at the rear edge of the requested compartment.

After having carried out the retrieving and storing operations, the doors 40/40a/40b that had been opened are closed again in a manual or automatic manner and are finally locked by the unit 13 in the closed condition. The unit 13 also controls the closing of the roller shutter 31, before, during or after the closing of the cover 24.

Owing to the above, it is evident that the device 22 is an ideal compromise between use flexibility and safety in case of tampering attempts. Indeed, the cover 24 made of doors allows the device 22 to gain sturdiness, as it forbids direct access to the roller shutter 31, whereas the latter allows the edge 29 of the passage 26 to be adjusted in a continuous manner. In particular, compared to solutions with rotary doors, the sliding solution:

makes the forced opening by means of breaking tools more difficult, allows for a minimization of the empty space accessible when the covers 24 and 25 are open, is relatively simple, as it eliminates the use of a roller shutter compared to the solution of IT 102017000089864, with a consequent reduction of costs and increase of reliability, exposes users to fewer shock risks, has an actuation that is more simple, quicker during opening and/or closing, and can be controlled more easily, for example so as to obtain a slowing down close to the crossbeam 42 and/or prevent users from possibly clamping their hands, has a more pleasant aesthetic appearance and is more user-friendly, can have an assisted manual movement that is relatively simple (the stop system remains inactive until reaching the requested opening size, for example by reading the position).

Furthermore, the fact of using one single roller shutter 31 for the cover 25 allows the number of components to be reduced compared to known solutions, without increasing the opening and closing times of the cover 25.

Other advantages in terms of simplicity of the suggested solution are evident to, or can be easily deduced by, any person skilled in the art based on the constructive features discussed above.

Finally, owing to the above, it is evident that the device 22 and the station 11 described above, with reference to the accompanying drawings, can be subjected to changes and variants, without for this reason going beyond the scope of protection of the invention set forth in the appended claims.

What is claimed is:

1. A selective access device for a picking/deposit station in an automated warehouse, the device comprising:
    an area which enables, in use, access to a housing of the station, after having formed a passage through the area, the passage having a front edge, a rear edge and two side edges opposite to one another;
    a first cover engaging the area and comprising a slidable flat surface operable to open, to define the front edge;
    a second cover, which engages the area above the first cover and consists of a plurality of doors arranged side by side along a first rectilinear axis and comprising respective end edges and respective sides, wherein the second cover is operable to open so that at least one of the sides defines a corresponding side edge of the passage,
    wherein the doors are slidable to open and close along respective second axes orthogonal to the first axis so that at least one of the end edges defines the rear edge of the passage when the second cover is open.

2. The device according to claim 1, wherein each of the doors is formed by a row of elements which are coupled to each other in a movable manner.

3. The device according to claim 2, wherein the doors are telescopic.

4. The device according to claim 2, wherein the elements are rotatable one with respect to the other about horizontal rotation axes.

5. The device according to claim 1, wherein the area is bounded by a crossbeam and by two arms joined to ends of the crossbeam, the end edges being arranged alongside the crossbeam in a closed condition and defining the rear edge in an open condition.

6. The device according to claim 1, wherein the first cover is defined by one single roller shutter.

7. The device according to claim 1, further comprising:
    a stop system configured so as to stop an opening stroke of the doors in a variable position;
    a control unit configured so as to control the stop system and stop the doors in a requested position.

8. The device according to claim 1, further comprising:
    a lock configured so as to stop the doors in a closed position;
    a control unit configured so as to control the unlocking of the lock and release at least one of the doors when opening of the second cover is required.

9. The device according to claim 1, further comprising:
    a moving device configured so as to drive the translation of the doors independently of one another; and
    a control unit configured to control the moving device to translate at least one of the doors towards a requested position.

10. A picking/deposit station of an automated warehouse, the station comprising:
    a housing having dimensions such as to house at least one loading unit-, for picking articles from the loading unit and/or for depositing articles into the loading unit, and
    a selective access device, arranged above the housing for enabling and preventing an access from above to the loading unit comprising:
    an area which enables, in use, access to the housing of the station, after having formed a passage through the area, the passage having a front edge a rear edge and two side edges opposite to one another:

a first cover engaging the area and comprising a slidable flat surface operable to open, so as to define the front edge;

a second cover, which engages the area above the first cover and consists of a plurality of doors arranged side by side along a first rectilinear axis and comprising respective end edges and respective sides, wherein the second cover is operable to open so that at least one of the sides defines a corresponding side edge of the passage, wherein the doors are slidable to open and close along respective second axes orthogonal to the first axis so that at least one of the end edges defines the rear edge of the passage when the second cover is open.

* * * * *